US012604033B2

(12) United States Patent
Poirier et al.

(10) Patent No.: US 12,604,033 B2
(45) Date of Patent: Apr. 14, 2026

(54) MOTION VECTOR CODING WITH INPUT MOTION VECTOR DATA

(71) Applicant: InterDigital CE Patent Holdings, SAS, Paris (FR)

(72) Inventors: Tangi Poirier, Thorigné-Fouillard (FR); Antoine Robert, Mézières sur Couesnon (FR); Edouard Francois, Bourg des Comptes (FR); Franck Galpin, Thorigne-Fouillard (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/699,079

(22) PCT Filed: Oct. 5, 2022

(86) PCT No.: PCT/EP2022/077646
§ 371 (c)(1),
(2) Date: Apr. 5, 2024

(87) PCT Pub. No.: WO2023/057488
PCT Pub. Date: Apr. 13, 2023

(65) Prior Publication Data
US 2025/0071321 A1     Feb. 27, 2025

(30) Foreign Application Priority Data

Oct. 5, 2021    (EP) ..................................... 21306393

(51) Int. Cl.
| | |
|---|---|
| *H04N 19/58* | (2014.01) |
| *H04N 19/52* | (2014.01) |
| *H04N 19/70* | (2014.01) |

(52) U.S. Cl.
CPC ............. *H04N 19/58* (2014.11); *H04N 19/52* (2014.11); *H04N 19/70* (2014.11)

(58) Field of Classification Search
CPC ......... H04N 19/52; H04N 19/58; H04N 19/70
See application file for complete search history.

(56) References Cited

U.S. PATENT DOCUMENTS

| | | |
|---|---|---|
| 2012/0082226 A1 | 4/2012 | Weber |
| 2012/0230392 A1 | 9/2012 | Zheng et al. |

(Continued)

FOREIGN PATENT DOCUMENTS

WO        2021/136747 A1       7/2021

OTHER PUBLICATIONS

Bubenicek et al., "Using Game Engine to Generate Synthetic Datasets for Machine Learning", Proceedings of CESCG 2020: The 24th Central European Seminar on Computer Graphics (CESCG), 2020, 5 pages.

*Primary Examiner* — Anner Holder
(74) *Attorney, Agent, or Firm* — Condo Roccia Koptiw LLP

(57) ABSTRACT

Systems, methods, and instrumentalities are disclosed for performing motion compensation with long-term history-based motion vector predictor candidate(s). A device configured for performing such motion compensation may include a processor. The processor may be configured to obtain a long-term motion vector predictor candidate. The processor may also be configured to add the long-term motion vector predictor candidate to a history-based motion vector prediction (HMVP) list for a current block. The processor may also be configured to decode the current block using the HMVP list having the long-term motion vector prediction candidate.

20 Claims, 15 Drawing Sheets

(56)        References Cited

U.S. PATENT DOCUMENTS

| | | | | |
|---|---|---|---|---|
| 2018/0311577 A1* | 11/2018 | Kopietz | ............... | H04N 19/176 |
| 2020/0112715 A1* | 4/2020 | Hung | ................... | H04N 19/433 |
| 2020/0359049 A1 | 11/2020 | Zhao et al. | | |
| 2021/0136405 A1 | 5/2021 | Chen et al. | | |
| 2021/0211708 A1* | 7/2021 | Lee | ...................... | H04N 19/107 |

* cited by examiner

200

1202

Obtain long-term motion vector predictor candidate

1204

Add long-term motion vector predictor candidate to a history-based motion vector prediction (HMVP) list for a current block

1206

Decode the current block

MOTION VECTOR CODING WITH INPUT MOTION VECTOR DATA

CROSS REFERENCE TO RELATED APPLICATIONS

This application is the National Stage Entry under 35 U.S.C. § 371 of Patent Cooperation Treaty Application No. PCT/EP2022/077646, filed Oct. 5, 2022, which claims priority to EP Provisional Patent Application No. 21/306,393.6, filed on Oct. 5, 2021, and entitled "MOTION VECTOR CODING WITH INPUT MOTION VECTOR DATA," the entirety of which is incorporated by reference as if fully set forth herein.

BACKGROUND

Video coding systems may be used to compress digital video signals, e.g., to reduce the storage and/or transmission bandwidth needed for such signals. Video coding systems may include, for example, block-based, wavelet-based, and/or object-based systems.

SUMMARY

Systems, methods, and instrumentalities are disclosed for performing motion compensation with input motion vector data (IMVD). In examples, video data, such as a video bitstream, may be received. A device, such as a video decoding device, a video encoding device, may include a processor configured to obtain a long-term motion vector predictor candidate. The long-term motion vector predictor candidate may be added to a history-based motion vector prediction (HMVP) list for a block. The block may be encoded and/or decoded based on the HMVP list having the long-term motion vector prediction candidate.

In examples, the long-term motion vector predictor candidate may be obtained from video data (e.g., a video bitstream). For example, the long-term motion vector predictor candidate may be obtained from the video data at one or more of block level, subblock level, tile level, slice level, coding tree unit (CTU) row level, or CTU level.

In examples, an enablement indicator configured to indicate whether long-term motion vector predictor candidate mode is enabled may be obtained. The long-term motion vector candidate may be obtained based on the enablement indicator indicating that long-term motion vector predictor candidate mode is enabled.

In examples, whether the long-term motion candidate is included in video data may be determined based on a long-term motion vector predictor candidate mode enablement indicator. The long-term motion vector predictor candidate may be obtained from the video data based on a condition that the long-term motion vector predictor candidate mode enablement indicator indicates that long-term motion vector predictor candidate mode is enabled.

In examples, the long-term motion vector predictor candidate may be obtained based at least in part on IMVD received from outside of video data (e.g., the video bitstream). The long-term motion vector predictor candidate may be obtained based at least in part on IMVD received from a gaming device.

In examples, a long-term motion vector predictor candidate may be obtained. The long-term motion vector predictor candidate may be added to an HMVP list for a current block. The current block may be encoded and/or decoded using the HMVP list having the long-term motion vector prediction candidate.

For example, whether to enable a long-term motion vector predictor candidate mode may be determined. A long-term motion vector predictor candidate mode enablement indicator configured to indicate whether the long-term motion vector predictor candidate mode is enabled may be included in video data (e.g., the bitstream) based on the determining. For example, the long-term motion vector predictor candidate mode enablement indicator may be included a sequence parameter set, a picture header, a slice header, and/or the like.

For example, whether to enable a long-term motion vector predictor candidate mode may be determined. An indication of the long-term motion vector predictor candidate may be included in video data based on a determination to enable the long-term motion vector predictor candidate mode.

The long-term motion vector predictor candidate may be exempt from HMVP candidate pruning. The long-term motion vector predictor candidate may be exempt from an HMVP first-in-first-out (FIFO) rule. The long-term motion vector predictor candidate may be exempt from HMVP candidate pruning associated with a redundancy check pruning rule. The long-term motion vector predictor candidate may be placed at the beginning of the HMVP list.

In examples, video data, such as a bitstream, may be received. The video data may include an indication of global motion information associated with multiple coding blocks and/or block-level indications configured to indicate block-specific motion information for individual blocks. The coding blocks may be reconstructed using the global motion information/or and the block-specific motion information for individual blocks. In examples, the global motion information may be received at a frame level, a slice level, a tile level, a sub-picture level, and/or a CTU level.

In examples, a first motion compensation may be performed on a coding block using the block-specific motion information. A second motion compensation may be performed on the coding block using the global motion information. Predicted coding blocks may be generated using the block-specific motion information for the individual blocks. A global motion vector predictor may be obtained for the coding block(s) based on the global motion information associated with the coding blocks. The coding blocks may be reconstructed based on the predicted coding blocks using the global motion vector predictor.

In examples, IMVD may be obtained. Global motion information associated with one or more coding blocks may be determined based on the IMVD. Coding blocks may be encoded using the global motion information. The video bitstream may include indication(s) of the global motion information.

For example, motion compensation may be performed on multiple coding blocks using the global motion information to generate predicted coding blocks. Block-level motion information may be determined for individual predicted coding blocks. One or more block level indications configured to indicate the block-level motion information for the plurality of coding blocks may be included in the video bitstream. The IMVD may be received from a game engine.

In examples, a first motion compensation may be performed on the coding blocks using the global motion information to generate predicted coding blocks. Block-level motion information may be determined for individual predicted coding blocks. Multiple block level indications configured to indicate the block-level motion information for the coding blocks may be included in the video bitstream.

Systems, methods, and instrumentalities described herein may involve a decoder. In some examples, the systems, methods, and instrumentalities described herein may involve an encoder. In some examples, the systems, methods, and instrumentalities described herein may involve a signal (e.g., from an encoder and/or received by a decoder). A computer-readable medium may include instructions for causing one or more processors to perform methods described herein. A computer program product may include instructions which, when the program is executed by one or more processors, may cause the one or more processors to carry out the methods described herein.

DETAILED DESCRIPTION

A more detailed understanding may be had from the following description, given by way of example in conjunction with the accompanying drawings.

Figure 1A:
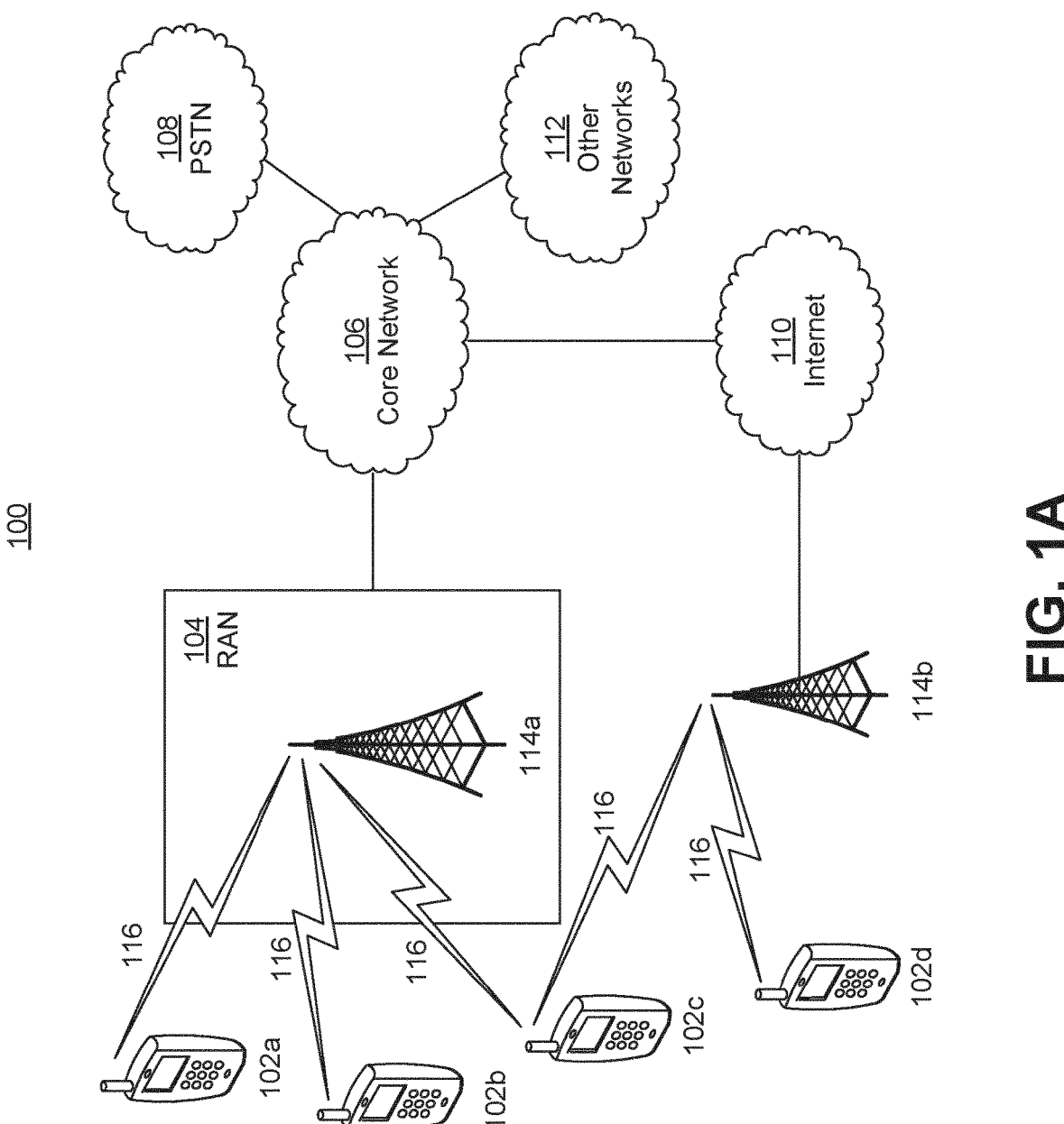
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
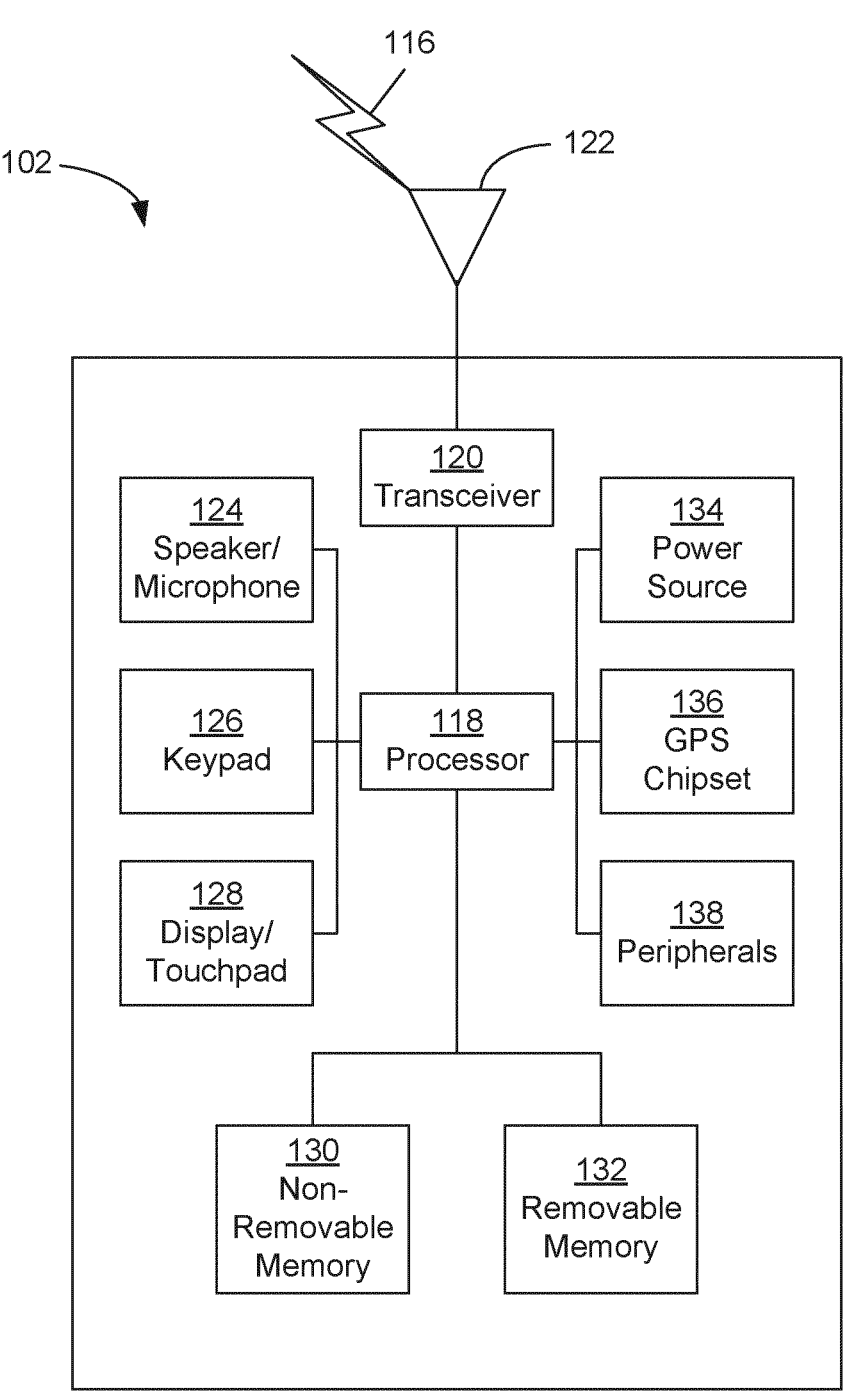
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
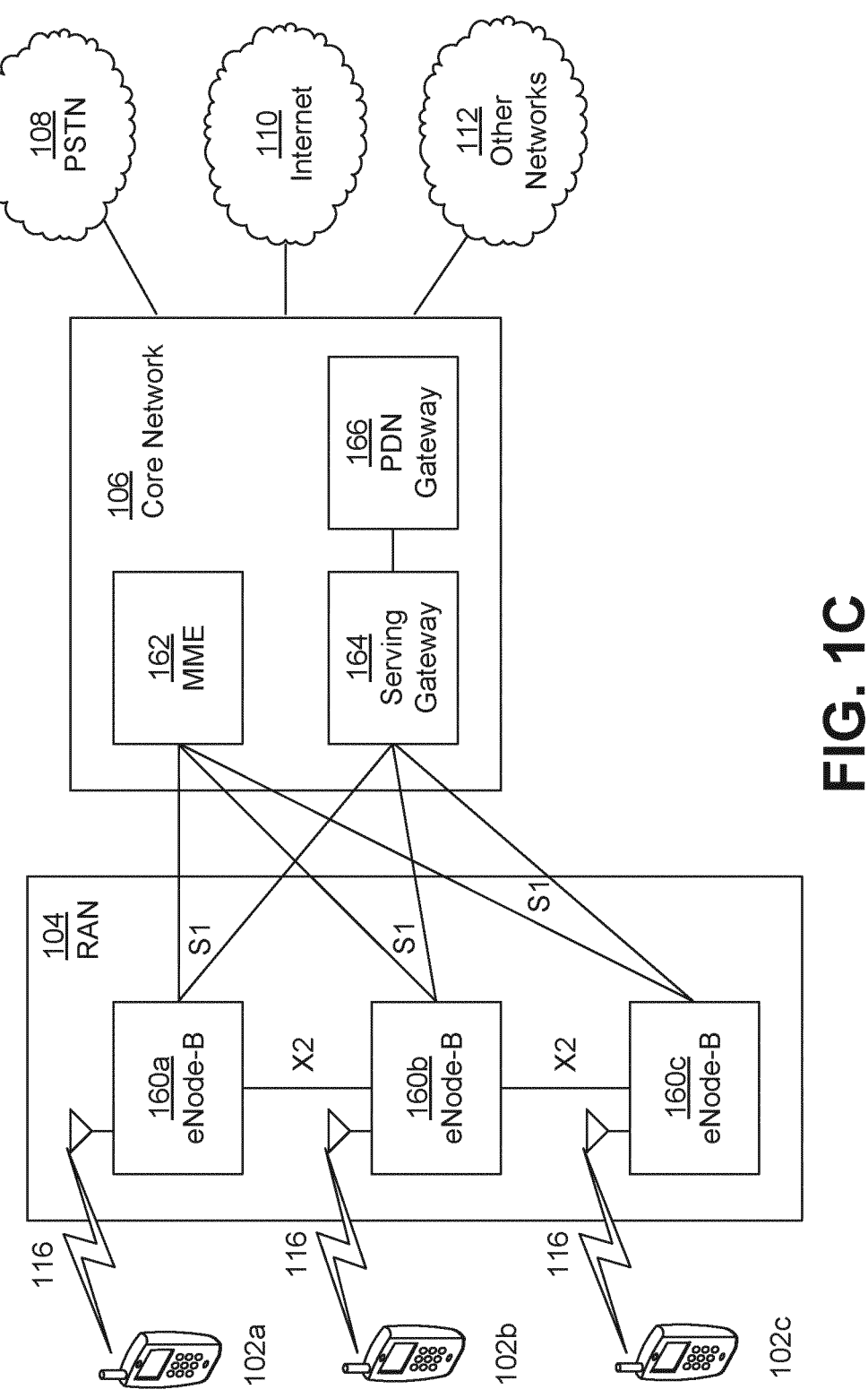
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily, or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
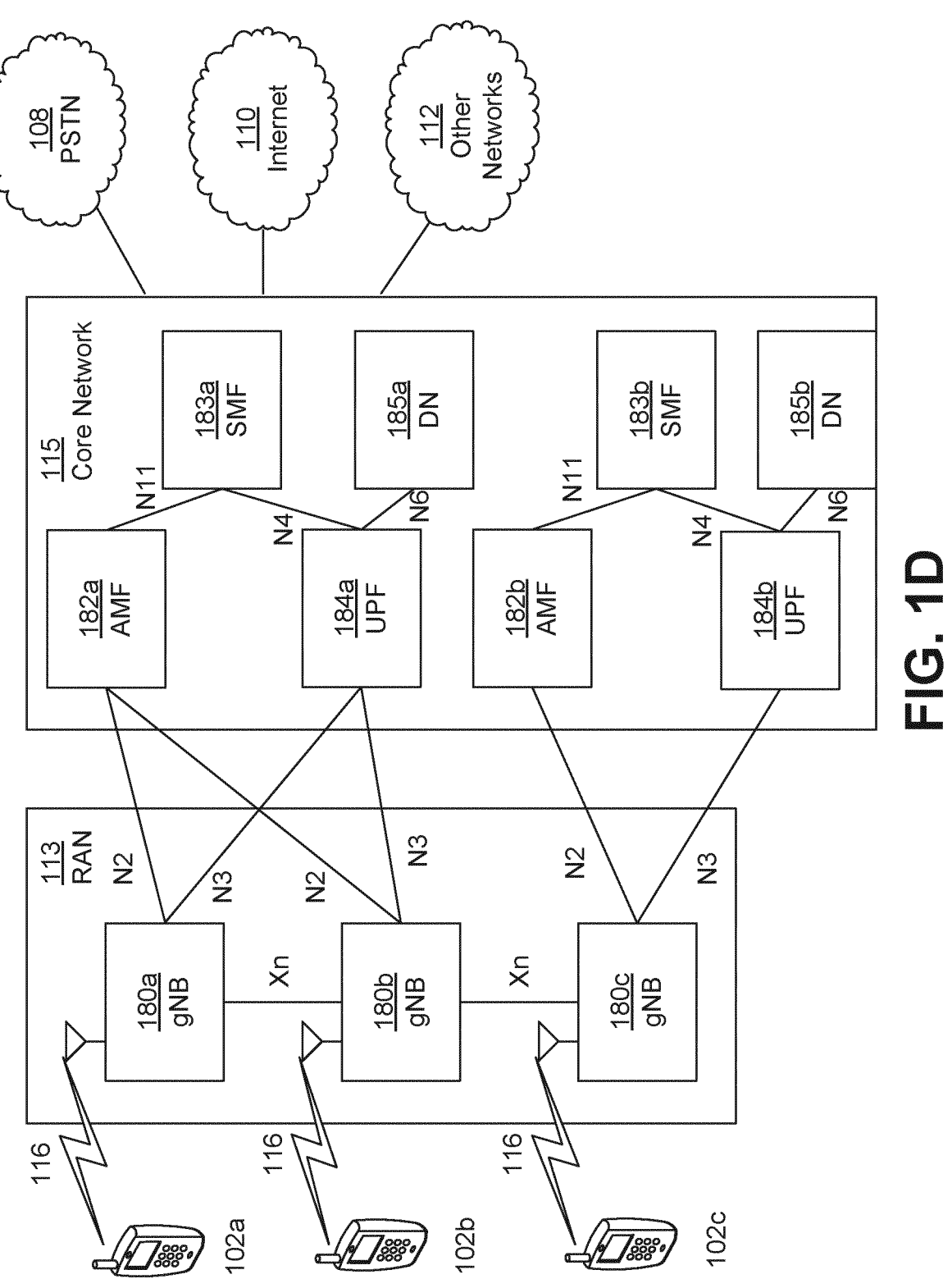
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

The aspects described and contemplated in this application may be implemented in many different forms. FIGS. 5-11 described herein may provide some examples, but other examples are contemplated. The discussion of FIGS. 5-11 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Figure 2:
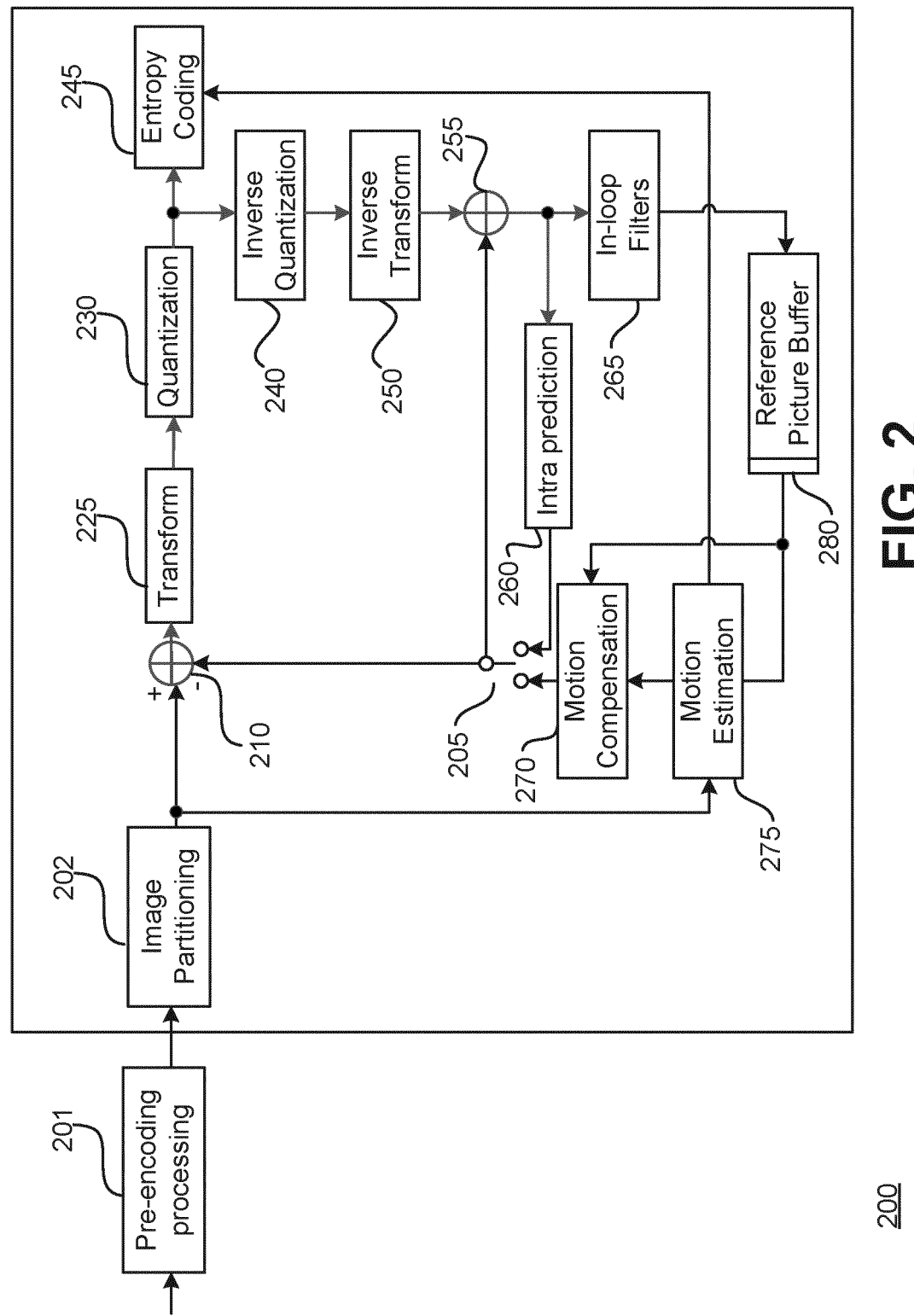
FIG. 2 illustrates an example video encoder.
Figure 3:
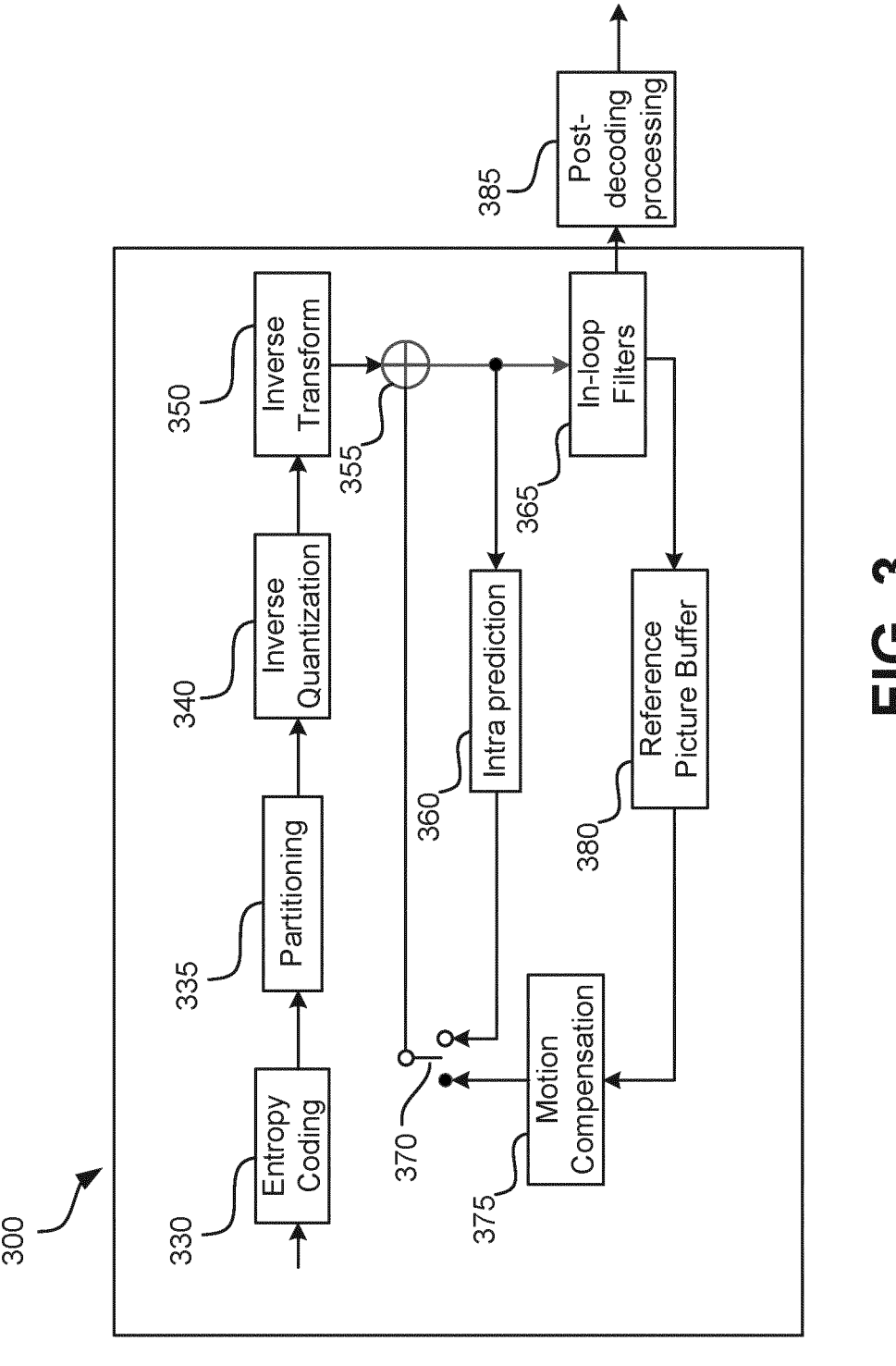
FIG. 3 illustrates an example video decoder.

Various methods and other aspects described in this application may be used to modify modules, for example, decoding modules, of a video encoder 200 and decoder 300 as shown in FIG. 2 and FIG. 3.

Moreover, the subject matter disclosed herein may be applied, for example, to any type, format, or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described the present application, such as 1, 2, 3, etc. These and other specific values are for purposes of describing examples and the aspects described are not limited to these specific values.

FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (e.g., conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream. In an example, the decoded images (e.g., after application of the in-loop filters (365) and/or after post-decoding processing (385), if post-decoding processing is used) may be sent to a display device for rendering to a user.

Figure 4:
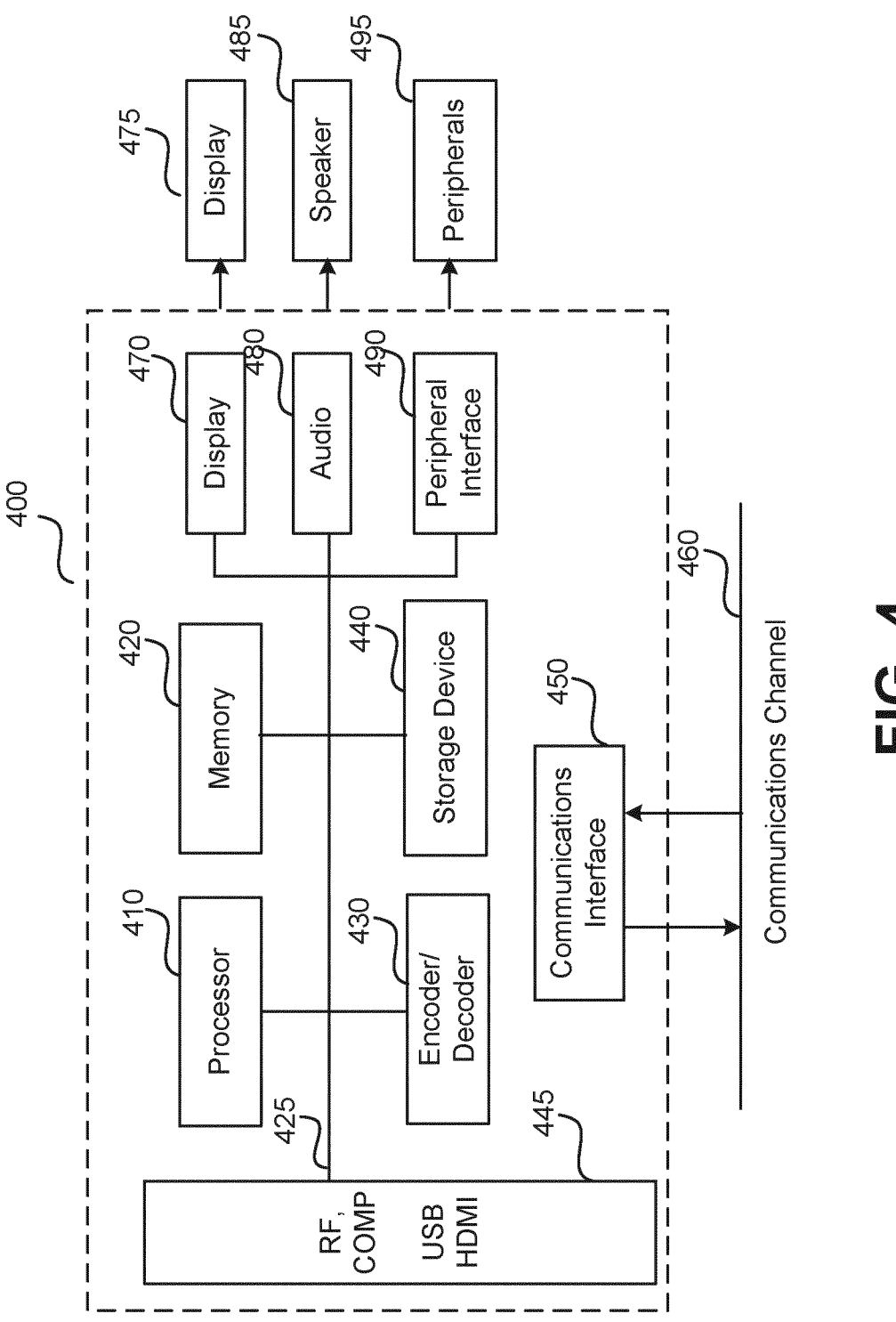
FIG. 4 illustrates an example of a system in which various aspects and examples may be implemented.

FIG. 4 is a diagram showing an example of a system in which various aspects and examples described herein may be implemented. System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (e.g., a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations.

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High-Definition Multimedia Interface (HDMI) input terminal. Other examples, not shown in FIG. 4, include composite video.

In various examples, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain examples, (iv) demodulating the downconverted and band-limited signal, (v) performing error correction, and/or (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

The USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing, Within the integrated housing, the various elements may be interconnected and transmit data therebetween using suitable connection arrangement 425, for example, an internal bus as known in the art, including the Inter-IC (12C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth® network.

The system 400 can provide an output signal to various output devices, including a display 475, speakers 485, and other peripheral devices 495. The display 475 of various examples includes one or more of, for example, a touch-screen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system.

Various examples use one or more peripheral devices 495 that provide a function based on the output of the system 400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application.

As further examples, in one example "encoding" refers only to entropy encoding, in another example "encoding" refers only to differential encoding, and in another example "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, coding syntax on input motion vector data (IMVD), HMVP list, long-term motion vector predictor candidate mode enablement indicator, motion compensation (e.g., motion compensation value), keep motion flag(s), global motion information, coding block, block-specific motion information, etc., are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, input motion vector data (IMVD), motion compensation (e.g., motion compensation value), keep motion flag(s), global motion information, block-specific motion information, etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on, or accessed or received from, a processor-readable medium.

Many examples are described herein. Features of examples may be provided alone or in any combination, across various claim categories and types. Further, examples may include one or more of the features, devices, or aspects described herein, alone or in any combination, across various claim categories and types. For example, features described herein may be implemented in a bitstream or signal that includes information generated as described herein. The information may allow a decoder to decode a bitstream, the encoder, bitstream, and/or decoder according to any of the embodiments described. For example, features described herein may be implemented by creating and/or transmitting and/or receiving and/or decoding a bitstream or signal. For example, features described herein may be implemented a method, process, apparatus, medium storing instructions, medium storing data, or signal. For example, features described herein may be implemented by a TV, set-top box, cell phone, tablet, or other electronic device that performs decoding. The TV, set-top box, cell phone, tablet, or other electronic device may display (e.g., using a monitor, screen, or other type of display) a resulting image (e.g., an image from residual reconstruction of the video bitstream). The TV, set-top box, cell phone, tablet, or other electronic device may receive a signal including an encoded image and perform decoding.

Figure 5:
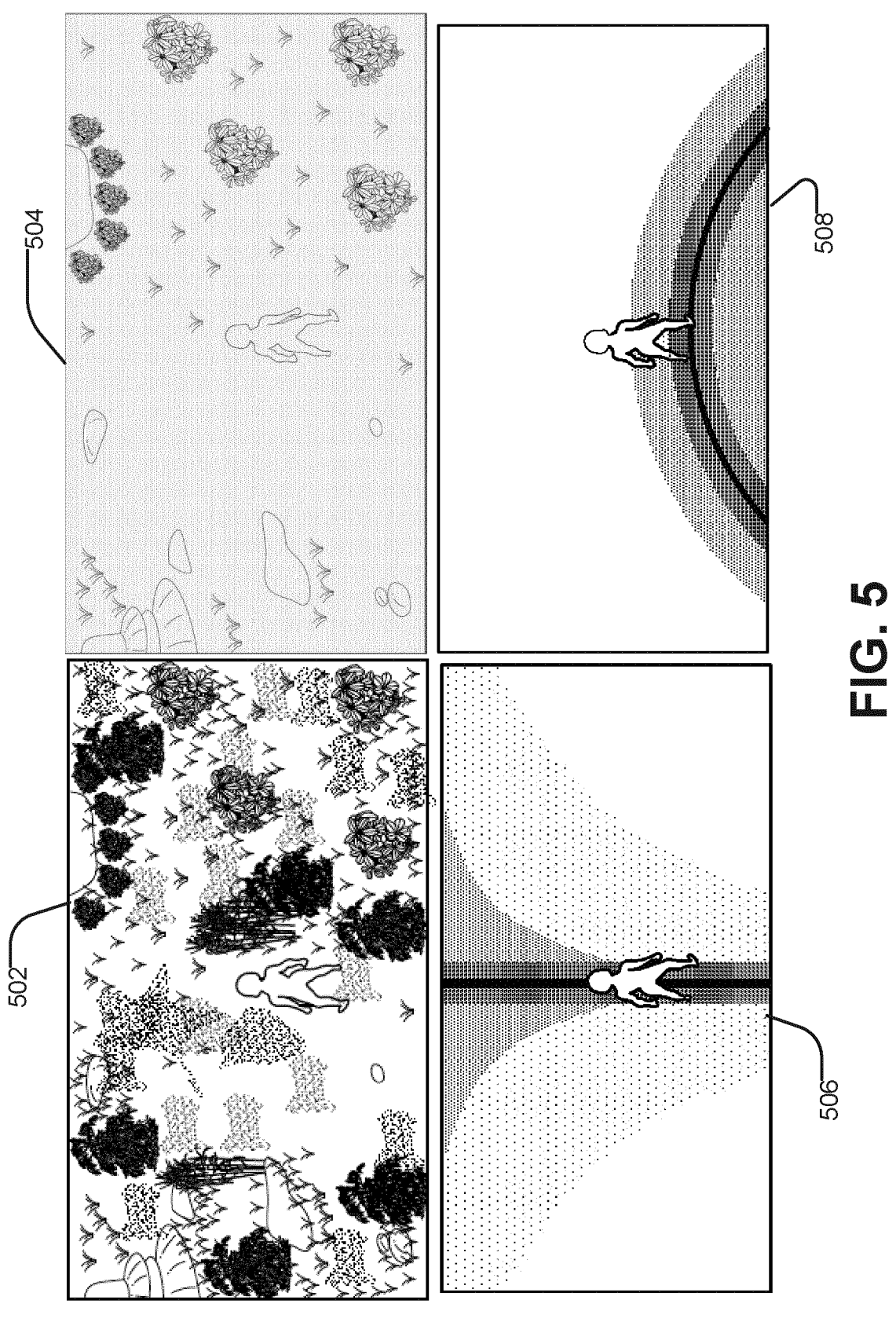
FIG. 5 illustrates an example texture frame 502 (e.g., a texture frame of a video game) with a corresponding depth map, horizontal motion data, and vertical motion data that may be extracted from a game engine.

A video coding system such as a cloud gaming server or a device with light detection and ranging (LiDAR) capabilities may receive input video frames (e.g., texture frames) and depth information (e.g., a depth map) and/or motion information, The input video frames, depth information, and/or motion information may be correlated. FIG. 5 illustrates an example texture frame 502 of a video game. The texture frame may be associated with a corresponding depth map 504, horizontal motion data 506, and vertical motion data 508 that may be extracted (e.g., directly) from a game engine that may be rendering a game scene. A depth map may be represented by a grey-level image. The gray-level image may indicate a distance between a camera and an object (e.g., an actual object). A depth map may represent a basic geometry of the captured video scene. In an example, a depth map may correspond to a texture picture of video content. The depth map may include a monochrome picture (e.g., a dense monochrome picture) of the same resolution as the luma picture. In examples, the depth map and the luma picture may be of different resolutions.

Figure 6:
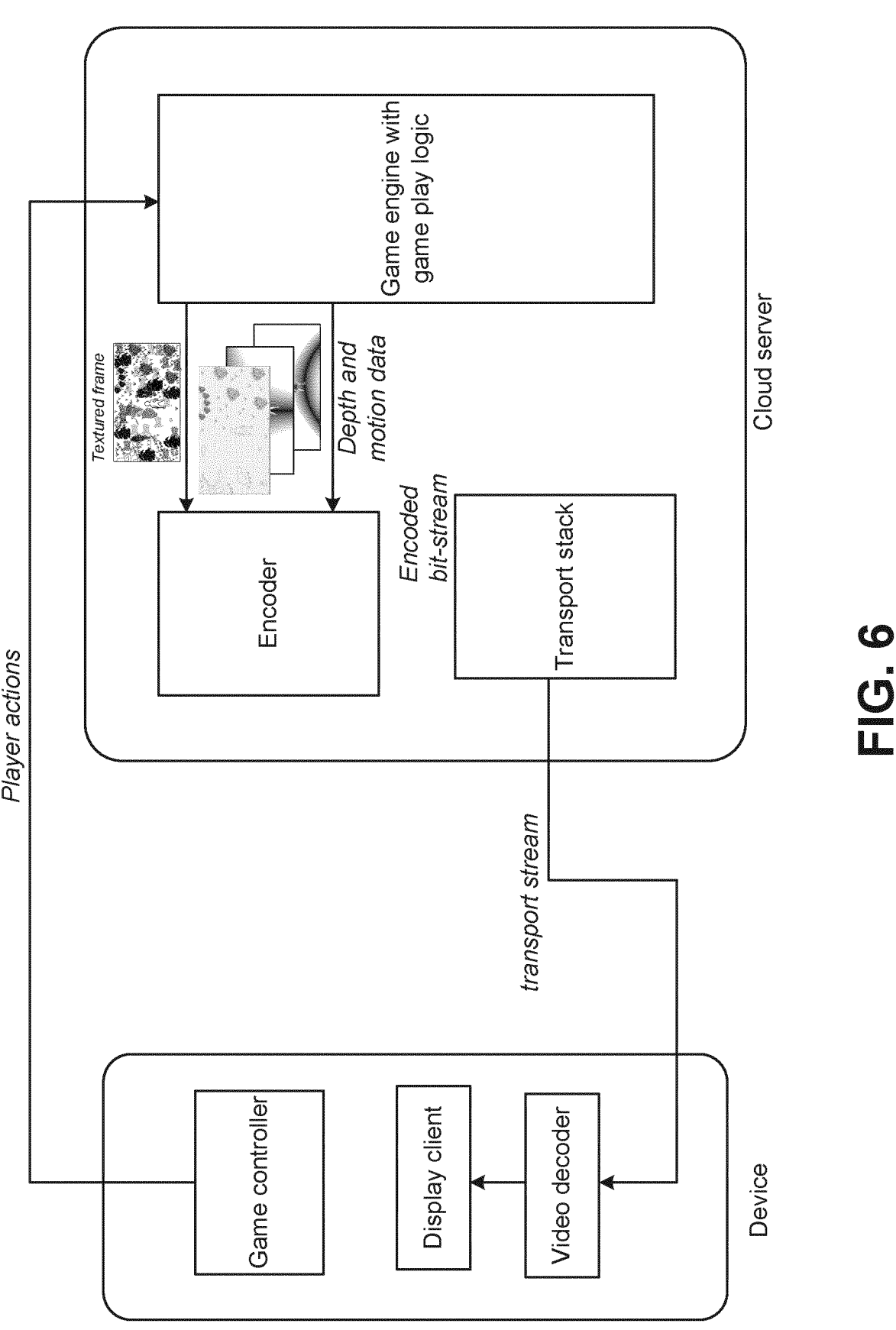
FIG. 6 illustrates an example architecture of a cloud gaming system, where a game engine may be running on a cloud server.

FIG. 6 shows an example architecture (e.g., a high level architecture) of a cloud gaming system, where a game engine may be running on a cloud server. The gaming system may render a game scene based on player actions. The rendered game scene may be encoded into video data (e.g., a bit-stream), for example, using an encoding device (e.g., a video encoder). The video data may be compressed (e.g., encapsulated) by a transport protocol. The video data may be sent to the player's device (e.g., sent to the player's device as a transport stream). The player's device may de-compress (e.g., de-encapsulate) and decode the transport stream and present the decoded video data (e.g., present the game scene to the player).

As illustrated in FIG. 6, additional information such as a depth map, motion information, an object ID, an occlusion mask, camera parameters, etc. may be obtained from a game engine (e.g., as outputs of the game engine) and made available to the device of the server (e.g., an encoder of the server device) as prior information.

History-based merge candidate(s) may be derived. In an example, history-based motion vector predictor (HMVP) merge candidates may be added to a merge candidate list, for example, after one or more of a spatial motion vector predictor (MVP) or temporal MVP (TMVP). In examples, the motion information of one or more coded blocks (e.g., previously encoded blocks, previously decoded blocks) may be stored (e.g., stored in a table) and used as an MVP for the current block (e.g., a current coding unit (CU). The table (e.g., the table with multiple HMVP candidates) may be maintained during the encoding and the decoding process. In an example, the table may reset (e.g., the table may be emptied) if a new coding tree unit (CTU) row is encountered to enable CTU row parallelism. In examples, a non-subblock inter-coded CU may exist, and the associated motion information may be added to the last entry of the table as an HMVP candidate. In an example, the HMVP table size S may be set to 6. Setting the HMVP table size S to 6 may indicate that up to five (5) HMVP candidates may be added to the table. A motion candidate (e.g., a new motion candidate) may be added to the table, and a constrained first-in-first-out (FIFO) rule may be utilized where a check (e.g., a redundancy check) may be applied (e.g., applied first) to find whether there is an identical HMVP in the table. In an example, an identical HMVP may be found. For example, the identical HMVP may be removed from the table, HMVP candidates (e.g., the other HMVP candidates) may be moved forward, and the identical HMVP may be inserted to an entry of the table (e.g., the last entry of the table).

In examples, HMVP candidates may be used (e.g., HMVP candidates may be used in the merge candidate list construction process). The HMVP candidate(s) in the table may be checked in reverse order (e.g., from most recent to oldest candidate) and inserted to the merge candidate list, for example, after the TMVP candidate. A redundancy check may be applied (e.g., a redundancy check may be applied on the HMVP candidates) to the spatial or temporal merge candidate.

In examples, one or more of the following may be performed (e.g., to reduce the number of redundancy check operations): the last two (2) entries (e.g., only the last two entries) of the HMVP table may be redundancy checked to A1 (e.g., left) and B1 (e.g., top) spatial merge candidates, or the merge candidate list construction process from HMVP may be terminated when (e.g., if) the total number of available merge candidates reaches a certain point, for example, the maximally allowed merge candidates minus 1.

HMVP candidates may be used in an affine-based motion vector predictor (AMVP) candidate list construction process. In an example (e.g., and unlike the merge process), the four (4) HMVP candidates (e.g., the first four (4) HMVP candidates) in the table may be checked in order (e.g., from oldest to most recent candidate) and inserted in the AMVP candidate list (e.g., after the TMVP candidate without any redundancy check).

A translation motion model may be applied for motion compensation (MC). In examples, one or more types of motion may exist (e.g., zoom in/out, rotation, perspective motion or other irregular motions). A block-based affine motion compensation may be applied. The affine motion field of a CU may be described by motion information of control point motion vectors, (e.g., two control point (e.g., 4-parameter) or three control point motion vectors (e.g., 6-parameter).

In an example, for a two (2) control point affine motion model, a motion vector at sample location (x, y) in a CU may be derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases}$$

In an example, for a three (3) control point affine motion model, motion vector at sample location (x, y) in a CU may be derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases}$$

Motion information (mv0x, mv0y) may be a motion vector of a top-left corner control point, and (mv1x, mv1y) may be a motion vector of a top-right corner control point, and (mv2x, mv2y) may be a motion vector of a bottom-left corner control point.

In examples, a 4×4 block-based affine prediction may be applied. For example, to derive the motion vector of a 4×4 luma subblock (e.g., each 4×4 luma subblock), the motion vector of the center sample of a subblock (e.g., each subblock) may be calculated based on the above equations and may be rounded to 1/16 fractional pel accuracy. The motion compensation interpolation filters may be applied to generate the prediction of a subblock (e.g., each subblock) with a derived motion vector. The subblock size of chroma-components may be set to be 4×4. In examples, the MV of a 4×4 chroma subblock may be calculated as the average of the MVs of the top-left and bottom-right luma subblocks in the collocated 8×8 luma region.

Two affine motion inter prediction modes may exist (e.g., as with translational motion inter prediction): affine merge mode and affine AMVP mode. Additional information provided by the game engine or other sources (e.g., particularly motion information) may be used to improve compression efficiency.

Motion vector coding may use the motion information extracted from a game engine or other motion information sources. The motion information may be used to avoid localized decisions, which may be costly for the overall coding of the frame.

In examples, input motion vector information (e.g., given by a game engine or precomputed) may be obtained. As described herein, motion information obtained from the game engine and/or precomputed motion information may be referred to as input motion vector data (IMVD). In examples, the IMVD may be obtained (e.g., received) from other sources or be computed before the encoding (e.g., motion estimation). The input motion vector information may be encoded, decoded, and/or used in various coding mode and coding tools.

In examples, a list of global motions may be constructed using IMVD, and the list of global motion may be sent to the decoder. The global motions may be removed from the frames prior to encoding, e.g., as pre-processing, and may be restored after decoding, e.g., as post-processing, to decrease the motion dynamic (e.g., overall motion dynamic) within the frames.

Global motion compensation may be performed based on IMVD. Known motion information may be obtained from the game engine (e.g., a user's previous inputs on a game controller) or other sources (e.g., IMVD) and may be sent to a decoding device (e.g., a decoder). The decoding device may obtain global motion predictors based on the IMVD. The global motion vector predictors may be translational, affine, or associated with a complex model. The global motion vector predictors may represent the main motion within a frame like the camera motion, the motion of the biggest moving, rotation or zoom, the motion of the background or foreground, and/or the like.

In examples, global motion information, such as indications of global motion predictors may be signaled on a frame basis (e.g., in a picture parameter set, tile, or slice header) or on a CTU basis (e.g., in a CTU or CU header). The global motion predictors may be used to perform a first motion compensation (e.g., a primer motion compensation), thus removing the global motion from the frame or the CTU. A predicted frame or a predicted CTU may be generated with less motion (e.g., this may be performed via pre-processing). The predicted frame or the predicted CTU may be encoded. At the decoding device, the global motion information may be decoded, the predicted frame or the predicted CTU may be reconstructed, and a motion compensation (e.g., global motion compensation) may be performed using the global motion (e.g., post-processing) to obtain the reconstructed frame/CTU.

In examples, the camera motion may be removed from the frame by a first motion compensation (e.g., using a global motion predictor that predicts the camera motion based on IMVD such as the game's previous camera motion). The associated global motion may be signaled at the frame level. The remaining motion in the predicted frame (e.g., the moving objects in the scene) may be encoded (e.g., via motion estimation) and decoded (e.g., based on motion information specific to individual blocks).

In examples, the HMVP candidates may include one or more candidates from the IMVD. The IMVD HMVP candidates may be exempt from a redundancy check. The IMVD HMVP candidates may be kept in the HMVP buffer during encoding/decoding. The HVMP list may be initialized at the beginning of each CTU row using IMVD or using candidates from neighboring CTUs. The IMVD HMVP candidate(s) may be moved to a position in the HMVP list (e.g., during a reordering process) such that the IMVD HMVP candidate(s) remain for the longest time in the HMVP list.

Figure 7:
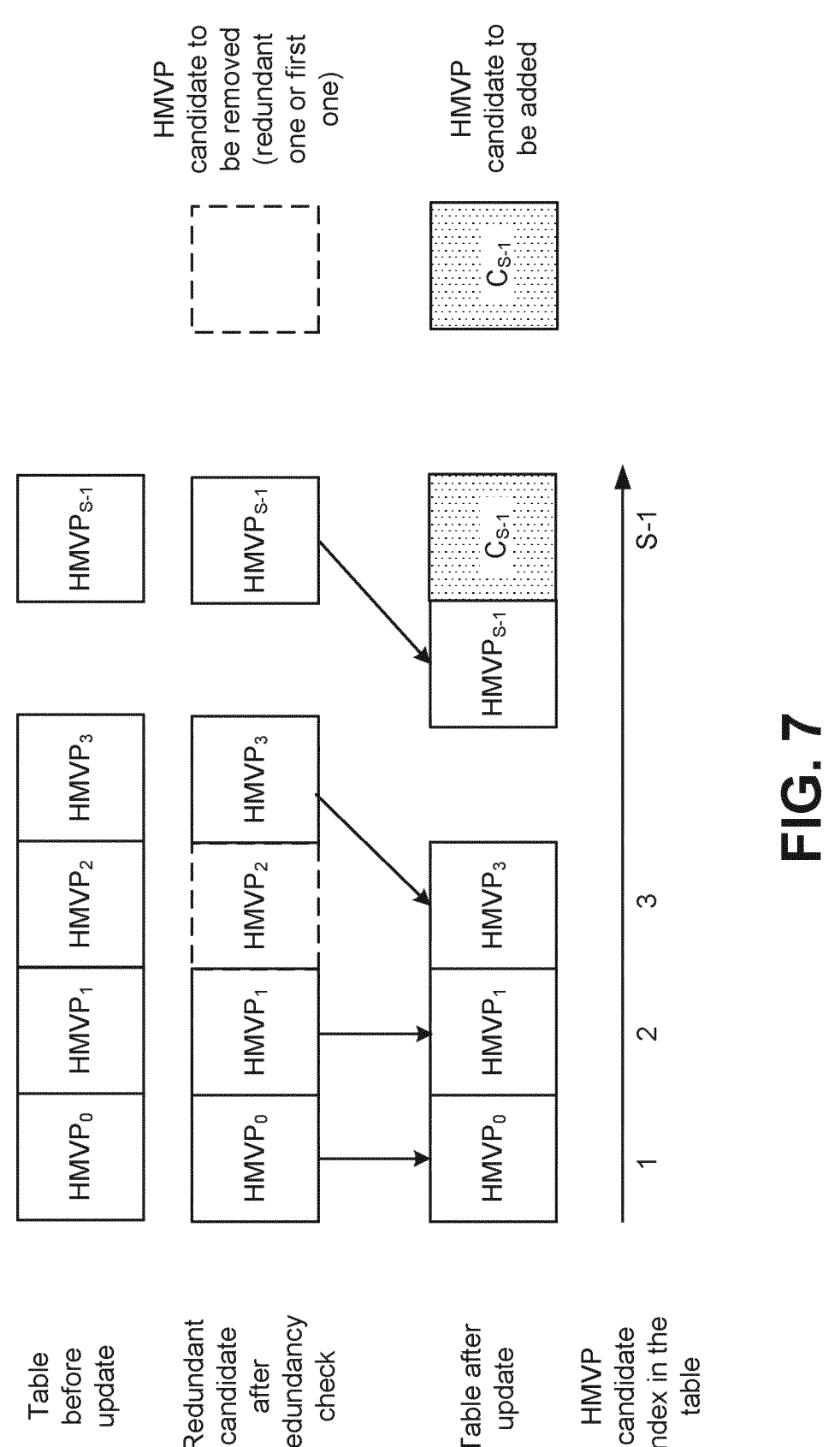
FIG. 7 illustrates an example of an updating process (e.g., a current updating process) of an HMVP table.

FIG. 7 shows an example of updating process of an HMVP table. Global motion vectors may be included in the HMVP list. IMVD HMVP candidates may be included in the HMVP list. In an example, HMVP process, the HMVP candidates in the list may be compared to a new candidate to check for redundancy, as shown in FIG. 7. As shown, if a new HMVP candidate is identical to an existing HMVP candidate, the new HMVP candidate may be added to the list, while the existing HMVP candidate may be removed.

Figure 8:
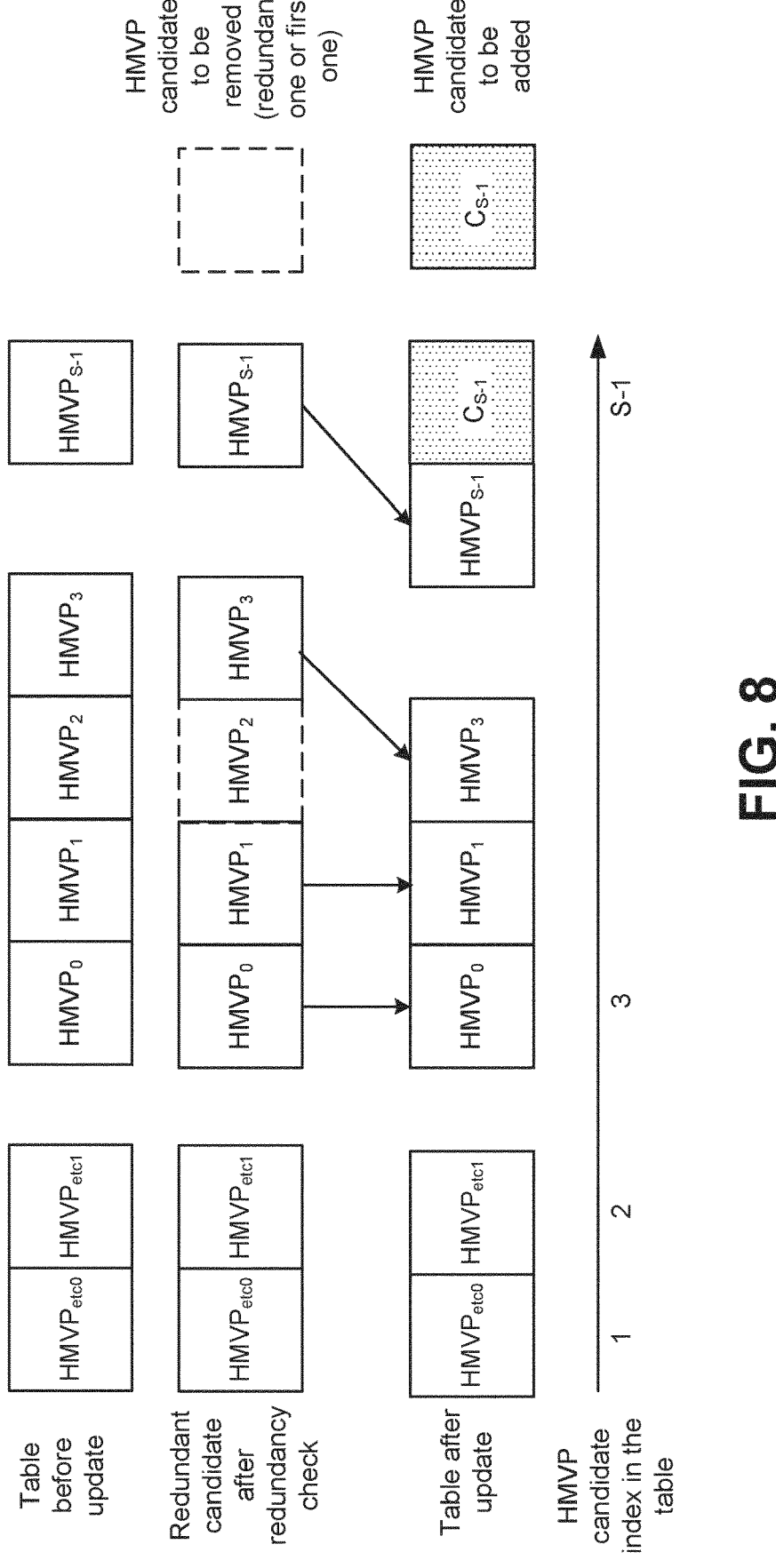
FIG. 8 illustrates an example of an updating process of the HMVP table with IMVD candidates.

FIG. 8 shows an example of an updating process of the HMVP table that may include IMVD candidates. In examples, IMVD motion vectors (e.g., motion vectors obtained from the game engine or other sources) may be added at the beginning of the HMVP list. The IMVD HMVP candidates may be long-term HVMP candidates. The IMVD HMVP candidates may be placed in a separate part of the HMVP list that does not follow the First-In-First-Out rule (FIFO), as shown in FIG. 8. For example, the IMVD motion vectors may not be checked for redundancy. For example, the long-term HVMP candidates that are exempt from redundancy check may be inserted at the end of the HMVP list. If a new HMVP candidate is identical to a long-term HMVP candidate, the long-term HMVP candidate may remain on the list while the new HMVP candidate may be excluded from the list.

For example, the HMVP list may include two parts, a long-term part and a FIFO part. As shown in FIG. 8, there may be two (2) HMVPs in the long-term part. When a new HMVP candidate is to be added to the HMVP list, the HMVPs in the long-term part of the HMVP list may remain on the HMVP list. An HMVP in the FIFO part may be removed from the HMVP list to make room for the new HMVP.

For example, a video encoding device may determine one or more HMVP candidate(s) for a CTU row and may include an indication of the initial HMVP candidate(s) in the video data. The initial HMVP candidate(s) may be determined based on and/or may indicate the motion information for the CTU row. The encoder may include an indication indicating to place HMVPs in the long-term part (e.g., instead of the FIFO part). A video decoding device may receive the indication of the initial HMVP candidate(s) and the indication to place HMVPs in the long-term part in the video data and construct an HMVP list for the CTU row based on the initial HMVP candidate(s) and the HMVP candidate(s) in the long-term part indicated in the video data. Initialization of the HMVP list may occur at the beginning of a CTU row. In examples, at the beginning of a CTU row (e.g., each CTU row), the HMVP table may be emptied (e.g., reset), and CTU parallelism may be allowed (e.g., the HMVP table may be emptied to allow CTU parallelism). In examples, at the beginning of a CTU row, no motion may be known, and the motion initialization may be costly (e.g., by using the AMVP mode and a zero MV as a predictor).

In examples, IMVD, such as available motion information from the game engine (e.g., available motion information coming from the game engine), may be used to initialize the HMVP list for the CTU row.

The initial HMVP candidates (e.g., global motion vector candidates) may be used to do one or more of the following: fill long-term HMVP candidates or fill the regular HMVP table.

In examples, one or more motion vectors may be used to fill long-term HMVP candidates (e.g., in the HMVP table), to overcome the motion discontinuities that may occur in the CTU row, which may currently be poorly predicted. A main motion vector (e.g., or multiple motion vectors, or an average of motion vectors, etc.) used in the CTU row may be inserted in the HMVP table, and the main motion vector(s) may stay in the HMVP table (e.g., may stay in the HMVP table for a long time). The long-term HMVP candidates may be exempt from the FIFO with a redundancy check updating process of the HMVP table, as described therein with reference to FIG. 8.

In examples, the HMVP table initialization at the beginning of a CTU row may use motion vectors from the above and/or above-right CTU, at a predefined position. For example, motion vectors at top-left, top-right, center, bottom-left, bottom-right position in the above CTU may be inserted to the HMVP list (e.g., in that order).

In an example, the HMVP table initialization at the beginning of a CTU row may use a motion vector explicitly signaled (e.g., in the video data). For example, a video encoding device may determine one or more initial HMVP candidate(s) for a CTU row and may include an indication of the initial HMVP candidate(s) in the video data. The initial HMVP candidate(s) may be determined based on and/or may indicate the motion information for the CTU row. The initial HMVP candidate(s) for the CTU row may be signaled with the first CTU of a new row (e.g., each new row). A video decoding device may receive the indication of the initial HMVP candidate(s) in the video data and construct an initial HMVP list for the CTU row based on the initial HMVP candidate(s) indicated in the video data.

In an example, an indicator (e.g., a flag) may be used to indicate whether initial HMVP(s) are explicitly signaled in the video data. A video decoding device may determine whether to receive the indication of the initial HMVP(s) based on the indicator. Based on a determination to receive the indication of initial HMVP(s), the video decoding device may receive the indication of initial HMVP candidate(s) and construct an initial HMVP list for the CTU row based on the initial HMVP candidate(s) indicated in the video data.

A motion vector in the HMVP list may be explicitly signaled (e.g., in the video data). As described herein, an indication of long-term HMVP candidate(s) may be included in the video data. For example, a video encoding device may determine one or more long-term HMVP candidate at a predetermined level (e.g., a sequence level, a picture level, a tile level, and/or a CTU level), and may include an indication of long-term HMVP candidate(s) that may be included in the video data. For long-term HMVP, the signaling may depend on the refreshing frequency (e.g., the refreshing frequency of the long-term HMVP candidates). The IMVD HMVP candidates may be signaled on a sequence, frame, and/or CTU basis. A video decoding device may receive the indication of long-term HMVP candidate(s) and construct an HMVP list based on the long-term HMVP candidate(s) indicated in the video data as described herein (e.g., filling the HMVP table with long-term HMVP candidates).

In an example, an indicator (e.g., a flag) may be used to indicate whether long-term HMVP(s) are explicitly signaled in the video data. A video decoding device may determine whether to receive the indication of long-term HMVP(s) based on the indicator. Based on a determination to receive the indication of long-term HMVP(s), the video decoding device may receive the indication of long-term HMVP candidate(s) and construct an HMVP list based on long-term HMVP candidate(s) indicated in the video data.

The candidates in the HMVP list may be reordered. The motion may be known (e.g., collected) from the game engine, and the HMVP candidate list may be reordered. The most probable motion vector predictor(s) (e.g., motion vector predictors that may be the mostly likely to correctly predict the current CU) may be moved to the best position(s) in the HMVP table (e.g., the first position for AMVP or last position for merge, as the most probable motion vector predictor(s) may be considered first).

Figure 9:
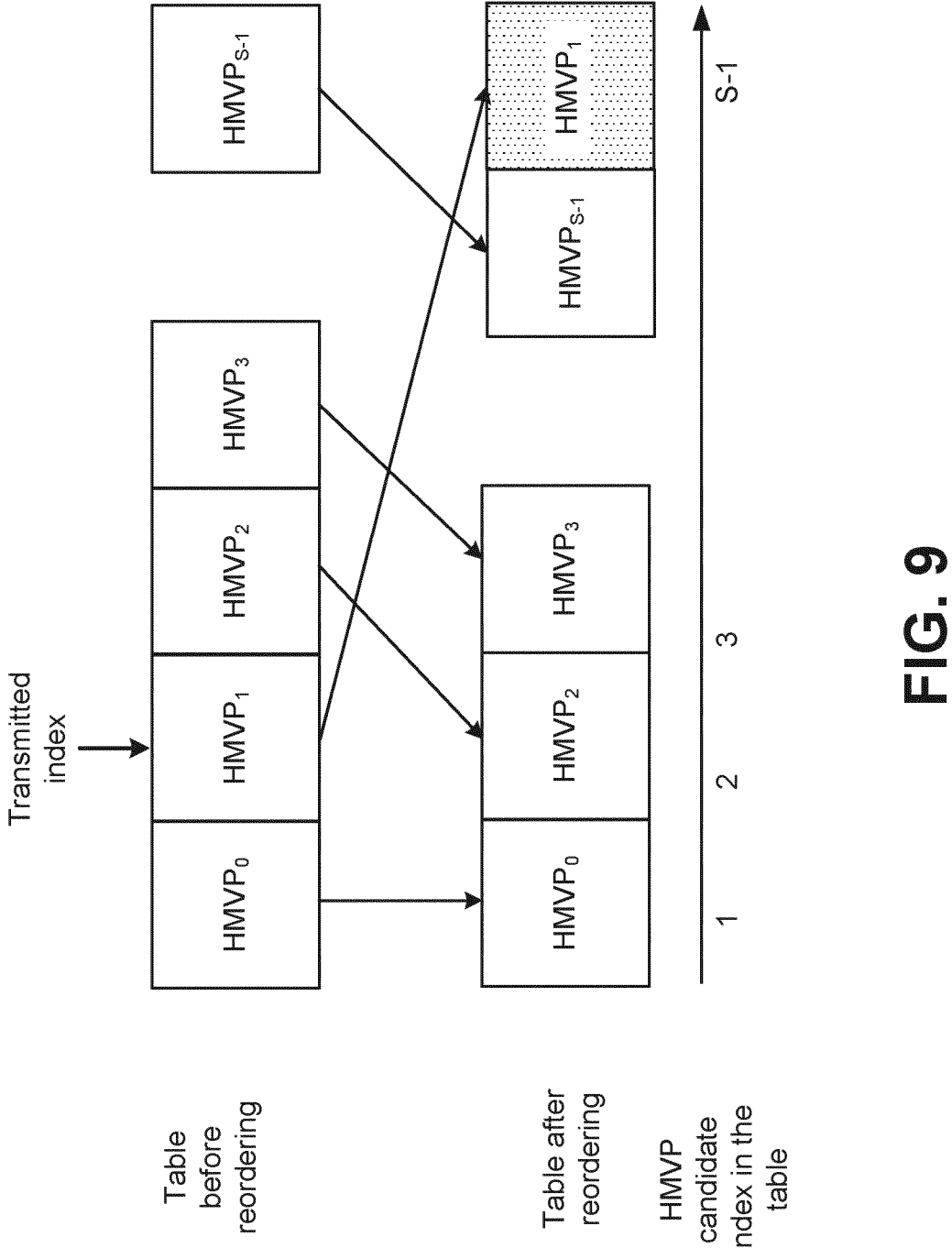
FIG. 9 illustrates an example of HMVP list reordering in the merge case with a transmitted index.

FIG. 9 shows an example of an HMVP list reordering in a merge case with a transmitted index. For a CU, an index within the HMVP list may be signaled to indicate the most probable motion vector predictor. Based on the CU mode (e.g., AMVP mode or merge mode), the HMVP candidate may be moved to the best position as shown in FIG. 9.

The signaled index may indicate the most probable MVP for the CTU. As shown in FIG. 9, the most probable motion vector predictor may be HMVP1. HMVP1 may become the last HMVP candidate (e.g., the candidate that may remain for the longest time in the (FIFO) HMVP list). In an example without reordering, HMVP1 may have been removed from the list after two (2) new HMVP candidate insertions. In examples, the HMVP list reordering may be restricted only once per CTU, e.g., to limit the complexity of the operation (e.g., index cost).

In examples, a motion vector may be coded for a later use. An indication (e.g., such as a flag) may be coded for an inter coded block (e.g., each inter coded block) to indicate whether the motion vector of the current block may be added in the HMVP buffer.

Alternative MV(s) may be coded for later use. Alternative motion vector predictors may be pushed in a predictor list (e.g., the HMVP buffer) during the decoding of a particular block (e.g., to improve the motion coding efficiency).

Figure 10:
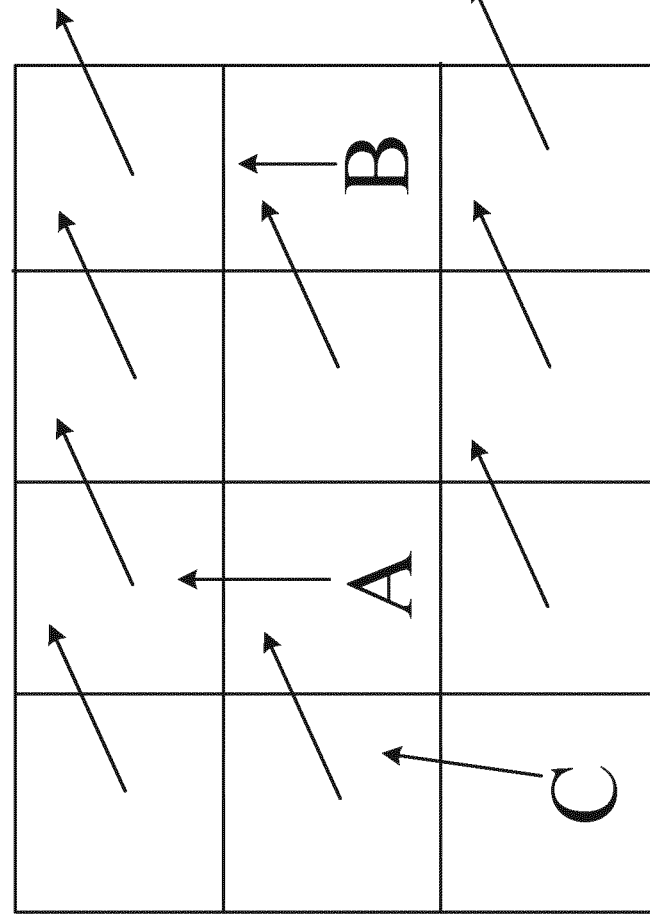
FIG. 10 illustrates an example of motion vectors in twelve (12) neighboring blocks.

FIG. 10 shows an example of motion vectors in twelve (12) neighboring blocks. The motion in each block may be similar except in three (3) blocks: A, B, and C. B and C may be coded, and the best predictor may be to use A. A may be unavailable because almost all vectors are different in the surrounding blocks of B and C.

In examples, the motion field(s) for the whole frame (e.g., 506 and 508 shown in FIG. 5) may be known in advance, for example, as an output from a game engine or by motion estimation. For example, at an encoder, A may be marked (e.g., marked by a process) as an important vector, and A may be indicated (e.g., by a process) as an important motion vector in the bitstream (e.g., set a flag associated with the motion vector). Based on the indication, the decoding device (e.g., the decoder) may put the indicated (e.g., flagged) motion vector in a motion vector predictor buffer for later use (e.g., a buffer similar to HMVP). In the buffer, the flagged motion vector may be kept in the buffer, for example, as long as the flagged motion vector is not used by another block.

In an example, a keep motion indication such as a keep_motion indicator (e.g., a keep_motion flag) in the CU syntax may be used, e.g., to mark a motion vector for later use. In examples, the keep_motion indicator may be added in AMVP mode (e.g., only in AMVP mode), e.g., to keep the merge syntax small. In examples, the indicator may be added in merge mode and may use a different entropy coding context from a coding context currently in AMVP.

In an example for encoding, it may be determined whether a motion vector is to be indicated as a motion vector to keep. The coding cost of setting the keep_motion indicator to 1 and the coding cost of the motion vector B and C using the kept motion vector may be compared to the coding cost of having the keep_motion indicator set to 0 and coding B and C without the motion vector predictor coming from A, e.g., to decide if a motion vector predictor is kept.

Figure 11:
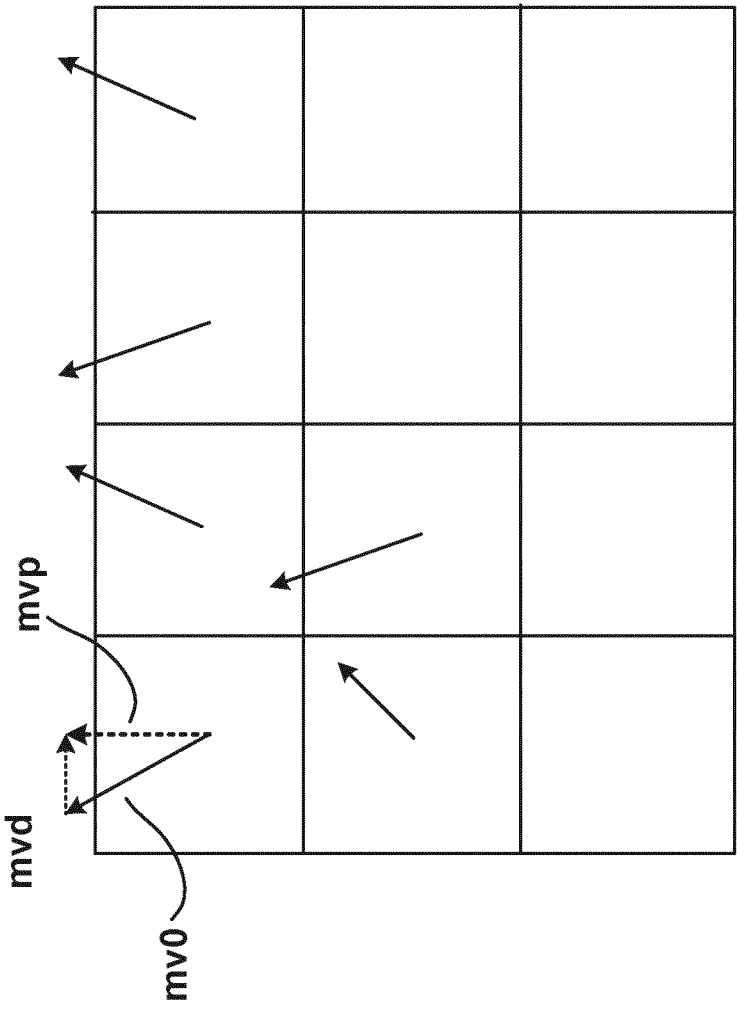
FIG. 11 illustrates an example of motion vector predictor coding.

FIG. 11 shows an example motion vector predictor coding. As described with respect to FIG. 11, multiple motion vectors may include a variation around an average motion vector and for each block. The motion vector may be different (e.g., significantly different) from the motion vector surrounding the blocks (e.g., which may lead to bad predictors to encode the motion vector). In examples, in addition to the keep_motion indicator as described herein, a motion vector difference (e.g., an optional motion vector difference) may be coded on top of the decoded motion vector. As shown in FIG. 11, mv0 may be the first decoded (e.g., by adding a motion vector predictor and a motion vector difference). The motion vector may be used to reconstruct the current block. A second motion vector difference may be decoded and added to the original motion vector. The result may be pushed as a motion vector predictor that may be for later use in a buffer (e.g., the HMVP buffer). As shown in FIG. 11, the motion vector pushed in the buffer (e.g., mvp) may be the sum of mv0 and mvd. The motion vector mvp may be computed as an average of the following motion vectors, e.g., to minimize the prediction error of the following motion vectors.

In an example at the encoding device (e.g., at the encoder), the motion vectors may be known in advance, and the best motion vector predictor may be computed using the coding cost of both the mvp and multiple motion vectors using the predictor.

In examples, a motion vector predictor (e.g., only one motion vector predictor) may be pushed in the buffer for later use. For example, a motion vector may be pushed in the buffer, and the keep_motion indicator may not be coded for subsequent blocks until the motion vector in the buffer may be used.

In examples, N motion vector predictors may be kept in the buffer. For example, the flag keep_motion may be coded when (e.g., only when) the total number of motion vector predictors in the buffer may be below N. In examples, the motion vector predictor in the buffer may always be kept (e.g., kept even if used) until a new motion vector may be flagged with keep_motion. If N predictors are used, a FIFO list may be used.

In examples, an enablement indicator may indicate whether a long-term motion vector predictor candidate mode is enabled. The long-term motion vector predictor candidate mode enablement indicator may be obtained (e.g., a video decoding device). The long-term motion vector candidate may be obtained based on the enablement indicator indicating that the long-term motion vector predictor candidate mode is enabled.

In examples, whether the long-term motion candidate is included in video data may be determined (e.g., by the video decoding device) based on the long-term motion vector predictor candidate mode enablement indicator. The long-term motion vector predictor candidate may be obtained from the video data based on a condition that the long-term motion vector predictor candidate mode enablement indicator indicates that the long-term motion vector predictor candidate mode is enabled.

One or more indications related to the long-term HMVP processes may be signaled in video data. For example, long-term HMVP mode may be enabled or disabled (e.g., at a sequence, picture, or slice level) via a long-term motion vector predictor candidate mode enablement indicator (e.g., a long-term HMVP indication). An example sequence level signaling is shown in Table 1:

TABLE 1

| | Descriptor |
|---|---|
| seq_parameter_set_rbsp( ) { | |
| ... | |
|     sps_temporal_mvp_enabled_flag | u(1) |
|     if( sps_temporal_mvp_enabled_flag ) | |
|       sps_sbtmvp_enabled_flag | u(1) |
|     sps_long_term_hmvp_enabled_flag | u(1) |
|     ... | |
| } | |

The long-term motion vector predictor candidate mode enablement indicator may include a sequence parameter set indicator. In examples as described in Table 1, the sps_long_term_hmvp_enabled_flag indicator may indicate whether the long term HMVP process described herein is enabled for the sequence of pictures associated with the sequence parameter set. For example, the sps_long_term_hmvp_enabled_flag indicator equal to one (1) may specify that the long term HMVP process may be enabled for the pictures associated with the sequence parameter set. The sps_long_term_hmvp_enabled_flag being equal to zero (0) may specify the long term HMVP process described herein may be disabled for the pictures associated with the sequence parameter set.

TABLE 2

| | Descriptor |
|---|---|
| picture_header_rbsp( ) { | |
|     ... | |
|     if( sps_mmvd_fullpel_only_enabled_flag ) | |
|       ph_mmvd_fullpel_only_flag | u(1) |
|     if( sps_long_term_hmvp_enabled_flag ) | |
|       ph_long_term_hmvp_enabled_flag | u(1) |
|     ... | |
| } | |

The long-term motion vector predictor candidate mode enablement indicator may include a picture header indicator. In examples as described in Table 2, the ph_long_term_hmvp_enabled_flag indicator may indicate whether the long term HMVP process described herein is enabled for the picture(s) associated with the picture header. For example, the ph_long_term_hmvp_enabled_flag indicator being equal to one (1) may specify that the long term HMVP process may be enabled for the current picture. The ph_long_term_hmvp_enabled_flag indicator being equal to zero (0) may specify that the long term HMVP process may be disabled for the current picture. As shown in Table 2, based on a condition that the sps_long_term_hmvp_enabled_flag equals to zero (0), specifying that the long term HMVP process is disabled for the pictures associated with the sequence parameter set, signaling of the ph_long_term_hmvp_enabled_flag indicator may be bypassed. When the ph_long_term_hmvp_enabled_flag indicator is not present in the video data, the value of ph_long_term_hmvp_enabled_flag may be inferred to equal to zero (0) (e.g., indicating that long-term HMVP is disabled for the current picture).

TABLE 3

| | Descriptor |
|---|---|
| slice_header( ) { | |
|     ... | |
|     if( ph_lmcs_enabled_flag && | |
|     !sh_picture_header_in_slice_header_flag ) | |
|       sh_lmcs_used_flag | u(1) |
|     if( ph_long_term_hmvp_enabled_flag && | |
|     !sh_picture_header_in_slice_header_flag ) | |
|       sh_long_term_HMVP_used_flag | u(1) |
|     ... | |
| } | |

The long-term motion vector predictor candidate mode enablement indicator may include a slice header indicator. In examples as described in Table 3, the sh_long_term_hmvp_enabled_flag indicator may indicate whether the long term HMVP process described herein is enabled for the slice(s) associated with the slice header. For example, the sh_long_term_hmvp_used_flag being equal to one (1) may specify that the long term HMVP may be used for the current slice. The sh_long_term_hmvp_used_flag indicator being equal to zero (0) may specify that the long term HMVP may not used for the current slice. As shown in Table 3, based on a condition that the ph_long_term_enabled_flag equals to zero (0), specifying that the long term HMVP process is disabled for slice(s) associated with the slice header, signaling of the ph_long_term_enabled_flag indicator may be bypassed. When the sh_long_term_hmvp_used_flag indicator is not present in the video data, the sh_long_term_hmvp_used_flag indicator may be inferred to be equal to the sh_picture_header_in_slice_header_flag indicator and ph_long_term_hmvp_enabled_flag indicator (e.g., the sh_picture_header_in_slice_header_flag indicator and the ph_long_term_hmvp_enabled_flag indicator may be equal to zero (0) (e.g., indicating that long-term HMVP is disabled for the current slice).

Figure 12:
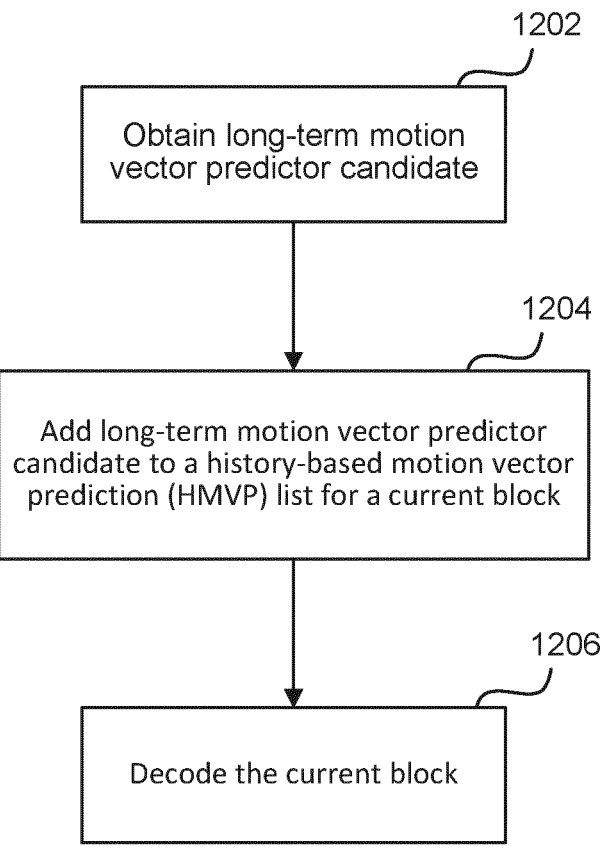
FIG. 12 illustrates an example of using long-term motion vector predictor candidate to decode a block.

FIG. 12 shows an example of motion vector coding with input motion vector data. In examples, video data such as a video bitstream may be received. At 1202, a long-term motion vector predictor candidate may be obtained. At 1204, the long-term motion vector predictor candidate may be added to a history-based motion vector prediction (HMVP) list for a current block. At 1206, the current block may be decoded based on the HMVP list having the long-term motion vector prediction candidate.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A video decoding device, the device comprising:
a processor configured to:
obtain a long-term motion vector predictor candidate;
add the long-term motion vector predictor candidate to a history-based motion vector prediction (HMVP) list for a current block, the HMVP list comprising the added long-term motion vector predictor candidate and a plurality of HMVP candidates derived based on a plurality of previously coded blocks; and
decode the current block using the HMVP list.

2. The device of claim 1, wherein the long-term motion vector predictor candidate is obtained from video data.

3. The device of claim 2, wherein the long-term motion vector predictor candidate is obtained from the video data at one or more of a frame level, slice level, coding tree unit (CTU) row level, or CTU level.

4. The device of claim 1, wherein the processor is further configured to:
obtain an enablement indicator configured to indicate whether a long-term motion vector predictor candidate mode is enabled, wherein the long-term motion vector candidate is obtained based on the enablement indicator indicating that the long-term motion vector predictor candidate mode is enabled.

5. The device of claim 1, wherein the processor is further configured to:
determine whether an indication of the long-term motion candidate is included in video data based on a long-term motion vector predictor candidate mode enablement indicator; and
based on a condition that the long-term motion vector predictor candidate mode enablement indicator indicates that a long-term motion vector predictor candidate mode is enabled, obtain the long-term motion vector predictor candidate from the video data.

6. The device of claim 1, wherein the long-term motion vector predictor candidate is obtained based at least in part on input motion vector data (IMVD) received from outside of a bitstream.

7. A method for video decoding, the method comprising:
obtaining a long-term motion vector predictor candidate;
adding the long-term motion vector predictor candidate to a history-based motion vector prediction (HMVP) list for a current block, the HMVP list comprising the added long-term motion vector predictor candidate and a plurality of HMVP candidates derived based on a plurality of previously coded blocks; and
decoding the current block using the HMVP list.

8. The method of claim 7, wherein the long-term motion vector predictor candidate is obtained from video data.

9. The method of claim 8, wherein the long-term motion vector predictor candidate is obtained from the video data at one or more of a frame level, slice level, coding tree unit (CTU) row level, or CTU level.

10. The method of any of claim 7, wherein the method further comprises:
obtaining an enablement indicator configured to indicate whether a long-term motion vector predictor candidate mode is enabled, wherein the long-term motion vector candidate is obtained based on the enablement indicator indicating that the long-term motion vector predictor candidate mode is enabled.

11. The method of claim 10, wherein the method further comprises:
determining whether an indication of the long-term motion candidate is included in video data based on a long-term motion vector predictor candidate mode enablement indicator; and
based on a condition that the long-term motion vector predictor candidate mode enablement indicator indicates that a long-term motion vector predictor candidate mode is enabled, obtaining the long-term motion vector predictor candidate from the video data.

12. The method of claim 10, wherein the long-term motion vector predictor candidate is obtained based at least in part on input motion vector data (IMVD) received from outside of a bitstream.

13. A video encoding device, the device comprising:
a processor configured to:
obtain a long-term motion vector predictor candidate;
add the long-term motion vector predictor candidate to a history-based motion vector prediction (HMVP) list for a current block, the HMVP list comprising the added long-term motion vector predictor candidate and a plurality of HMVP candidates derived based on a plurality of previously coded blocks; and
encode the current block using the HMVP list.

14. The device of claim 13, wherein the processor is further configured to:

determine whether to enable a long-term motion vector predictor candidate mode; and include, in video data, a long-term motion vector predictor candidate mode enablement indicator configured to indicate whether the long-term motion vector predictor candidate mode is enabled based on the determining.

15. The device of claim 14, wherein the long-term motion vector predictor candidate mode enablement indicator is included in least one of: a sequence parameter set, a picture header, or a slice header.

16. The device of claim 13, wherein the processor is further configured to:

determine whether to enable a long-term motion vector predictor candidate mode; and based on a determination to enable the long-term motion vector predictor candidate mode, include an indication of the long-term motion vector predictor candidate in video data.

17. A method for video encoding, the method comprising:

obtaining a long-term motion vector predictor candidate;

adding the long-term motion vector predictor candidate to a history-based motion vector prediction (HMVP) list for a current block, the HMVP list comprising the added long-term motion vector predictor candidate and a plurality of HMVP candidates derived based on a plurality of previously coded blocks; and encoding the current block using the HMVP list.

18. The method of claim 17, wherein the method further comprises:

determining whether to enable a long-term motion vector predictor candidate mode; and including, in video data, a long-term motion vector predictor candidate mode enablement indicator configured to indicate whether the long-term motion vector predictor candidate mode is enabled based on the determining.

19. The method of claim 18, wherein the long-term motion vector predictor candidate mode enablement indicator is included in least one of: a sequence parameter set, a picture header, or a slice header.

20. The method of claim 17, wherein the method further comprises:

determining whether to enable a long-term motion vector predictor candidate mode; and based on a determination to enable the long-term motion vector predictor candidate mode, including an indication of the long-term motion vector predictor candidate in video data.

* * * * *